United States Patent [19]

Biermeier et al.

[11] Patent Number: 4,703,374

[45] Date of Patent: Oct. 27, 1987

[54] MAGNETIC DISK MEMORY HAVING A DISK PACK SEATED AT BOTH SIDES IN RESILIENTLY-DESIGNED HOUSING

[75] Inventors: Johann Biermeier, Munich; Otto Olbrich, Taufkirchen; Albert Dierkes, Planegg, all of Fed. Rep. of Germany

[73] Assignee: Siemens Aktiengesellschaft, Berlin and Munich, Fed. Rep. of Germany

[21] Appl. No.: 696,202

[22] Filed: Jan. 29, 1985

[30] Foreign Application Priority Data

Feb. 7, 1984 [DE] Fed. Rep. of Germany ....... 3404208

[51] Int. Cl.⁴ ............................................. G11B 5/012
[52] U.S. Cl. ...................................................... 360/98
[58] Field of Search ................................... 360/97, 98

[56] References Cited

U.S. PATENT DOCUMENTS

| | | | |
|---|---|---|---|
| 3,553,663 | 1/1971 | Scholz | 340/174.1 |
| 3,593,332 | 7/1971 | Strehl | 360/97 |
| 3,817,088 | 6/1974 | Herbig | 73/66 |
| 3,838,464 | 9/1974 | Doyle | 360/137 |
| 4,150,406 | 4/1979 | Stollorz | 360/97 |
| 4,315,288 | 2/1982 | Bernett et al. | |
| 4,359,762 | 11/1982 | Stollorz | 360/98 |

FOREIGN PATENT DOCUMENTS 0064731 11/1982 European Pat. Off. .
2092834 8/1982 United Kingdom .

OTHER PUBLICATIONS

Swartz, J., "Motor in Spindle . . . 140M Bytes", Mini-Micro Systems, Feb. 1983, pp. 143–148.
Yasunaga et al., "Mechanisms for . . . Disk Storage", Review of the Elec. Comm. Lab., 1982, vol. 30, No. 1, pp. 46–56.

*Primary Examiner*—A. J. Heinz
*Attorney, Agent, or Firm*—Hill, Van Santen, Steadman & Simpson

[57] ABSTRACT

A magnetic disk memory has a disk pack with a revolving spindle, the disk pack being seated at both sides in a housing and being driven by a drive motor arranged within the hub. The spindle is seated at mutually opposite walls of a supporting shell of the housing with a pair of ball bearings which are tensioned in the axial direction. To this end, each ball bearing is fixed with an interference fit on a respective axial peg of the spindle and is likewise disposed with interference fit in a respective bearing bushing. One of the bearing bushings is inserted into and fixed in a slot let into one wall of a supporting shell of the housing. Assigned to the other bearing bushing is a resilient wall section in the other wall of the supporting shell at which section the second bearing bushing is fixed pressing inwardly against the spring power of this wall region.

35 Claims, 3 Drawing Figures

MAGNETIC DISK MEMORY HAVING A DISK PACK SEATED AT BOTH SIDES IN RESILIENTLY-DESIGNED HOUSING

CROSS REFERENCE TO RELATED APPLICATIONS

This application is related to the following applications:
Ser. No. 696,184, filed Jan. 29, 1985;
Ser. No. 696,203, filed Jan. 29, 1985;
Ser. No. 696,204, filed Jan. 29, 1985;
Ser. No. 696,205, filed Jan. 29, 1985; and
Ser. No. 696,207, filed Jan. 29, 1985.

BACKGROUND OF THE INVENTION

1. Field of the Invention

The present invention relates to a magnetic disk memory comprising a disk pack which has a revolving spindle and a pair of ball bearings disposed on pegs of the spindle, the ball bearings being fixed, braced in the axial direction, to opposite walls of a one-piece supporting shell of a housing, the supporting shell having a cover.

2. Description of the Prior Art

A distinction is generally made in magnetic disk memories between fixed disk memories and interchangeable disk memories. Technical development is continuing to proceed in the direction of higher and higher storage capacities, both in view of the track density and the bit density as the characteristic for the storage capacity per disk surface, on the one hand, as well as in view of the mechanical structure in order to be able to accommodate as many magnetic disks as possible in a prescribed mounting space. An example of this is the so-called $5\frac{1}{4}''$ fixed disk memory whose magnetic disks have an outer diameter of 130 mm and in inner diameter of 40 mm according to the German industrial standard. Analogous to the dimensions of competing floppy disk drives, a mounting space having a mounting height of 82.5 mm and a base area of 146 mm $\times$ 203 mm has crystallized out of this type of storage as a uniform size which is available for the overall apparatus including the housing and the appertaining electronics.

The desire to accommodate as many magnetic disks as possible in this prescribed mounting space is subordinate to the developmental goal of higher storage capacities and to the efforts to increase the recording density on the magnetic disk themselves. Within the scope of this structural attempt, embodiments of $5\frac{1}{4}''$ fixed disk memories have been disclosed in which the drive motor for the disk pack has been miniaturized to such a degree and has been structurally designed such that it can still be built into the hub of the disk pack, even given a prescribed inner diameter of 40 mm for the disk packs. An element which has significant codetermining effect on the overall height of conventional fixed disk memories is therefore integrated in the hub of the magnetic disk pack and the overall height which may be exploited for the disk stack itself is therefore expanded. Based on current conditions in the size of the combined magnetic heads and of the disk thickness, disk packs which contain up to eight magnetic disks stacked on top of one another have therefore become possible. The remaining overall height is required for the housing and for the device electronics.

As mentioned above, the recording density on the magnetic disk is the product of the write density times the track density. A significant criterion for the structural format of a magnetic disk memory also occurs for the case of the present invention, specifically from the track density having, for example, more than 1000 tracks per inch. This high track density requires a best possible vibration-free seating of the spindle of the disk pack in the housing. Requirements are therefore made for this type of storage such as heretofore played a part only given larger disk memories, for example the 14" disk memories.

Given high performance memories conventionally having a larger diameter, it is generally known to seat the spindle of the disk pack at one side in a heavy base plate, in part in structures of a highly-sophisticated design, this particularly applying to interchangeable disk memories wherein the disk pack must be removable from the magnetic storage device. On the other hand, structures are also known in which the spindle is seated at both sides in a rigid housing surrounding the pack. In order to achieve as vibration-free a spindle seating as possible, a fixed bearing and a movable bearing are employed given this two-sided and a spring is provided adjacent the movable bearing, the spring tensing the two bearings relative to one another after assembly such that a coaxial spindle guidance that is as free of axial play as possible is achieved. However, this goal can only be achieved to a limited extent when a combination of fixed and axially movable bearings is employed. Furthermore, additional mounting space is required for the incorporation of the spring, this being lost as useable storage space and taking away valuable space even when the motor is built into the hub.

SUMMARY OF THE INVENTION

It is therefore a main object of the present invention to provide a two-sided bearing of a disk-pack in a housing for a magnetic disk memory which is designed in a space-saving manner, which, under given conditions, allows a drive motor to be built into the hub of the disk pack and which s nonetheless structurally simple. Ball bearings, particularly ball bearings fixedly mounted on the hub, should thereby be disposed free of play despite permissible mechanical tolerances in the bearing structure, whereby the desired coaxialism of the ball bearings must be achieved without adjustment operations. Moreover, the disk pack, including the bearings, should be capable of being assembled as a module and also be accessible as a finished unit inserted into the housing in order to be able to undertake tests and final assembly operations such as balancing, etc., in the built-in condition.

Given a magnetic disk memory of the type initially mentioned, the above object is achieved, according to the present invention in a disk memory which is characterized in that one wall of the supporting shell comprises a slot in the region of the bearing location of the spindle which is opened toward the edge of the supporting shell and which has a 180° curvature at its bottom and the opposite wall comprises a resilient region having reduced wall thickness coaxial to the spindle axis. It is further characterized in that the ball bearings are disposed with respective interference fits both within the spindle pegs and on respective bearing bushings, whereby a first of the bearing bushings is disposed in the slot and a second of the bearing bushings is fixed at the inside of the resilient upon tensioning of this region in the axial direction. This solution is particularly distinguished in that an unequivocally play-free bearing of the spindle of the disk pack is achieved with the assistance of the two bearings mounted with interference fit instead of the usual combination of a movable bearing and a fixed bearing, so that the play that is unavoidable given a movable bearing is eliminated. Furthermore, the housing is designed such that, as a result of the resiliently-designed region that a separate restraining element is not required. The part of the mounting space thereby gained can be added to the useable overall height, i.e., the height of the disk pack.

Since the two bearing locations of the disk pack are disposed in opposite walls of a one-piece supporting shell of the housing, these bearing locations with the fitting surfaces appertaining thereto can be produced in one chucking operation, this being of considerable significance for achieving the goal of coaxialism of the spindle bearings.

This bearing structure, in conjunction with the design of the hub as a hollow member, permits the resiliently-restrained bearing location including the bearing bushing to be kept so narrow in dimension that the bearing arrangement can be incorporated in the hollow member of the hub. This, in turn, enables an assembly-friendly structure of the disk pack having a hub which comprises a collar at its end proximate to the first bearing bushing as a seating surface for the outermost of the magnetic disks, whereby the magnetic disks, kept apart by way of spacers, are slipped onto the outer surface of the hub. At its other end, the hub comprises a turn-in portion into which a centering projection of a tensioning ring is inserted, the tensioning ring being fixed at the allocated end face of the hub with fastening screws. This structural design permits a storage disk that may have become damaged under certain conditions to be replaced by releasing the tensioning ring without individual elements of the bearing locations having to be dismanteled for that purpose.

BRIEF DESCRIPTION OF THE DRAWINGS

Other objects, features and advantages of the invention, its organization, construction and operation will be best understood from the following description taken in conjunction with the accompanying drawings, on which.

DESCRIPTION OF THE PREFERRED EMBODIMENTS

Figure 1:
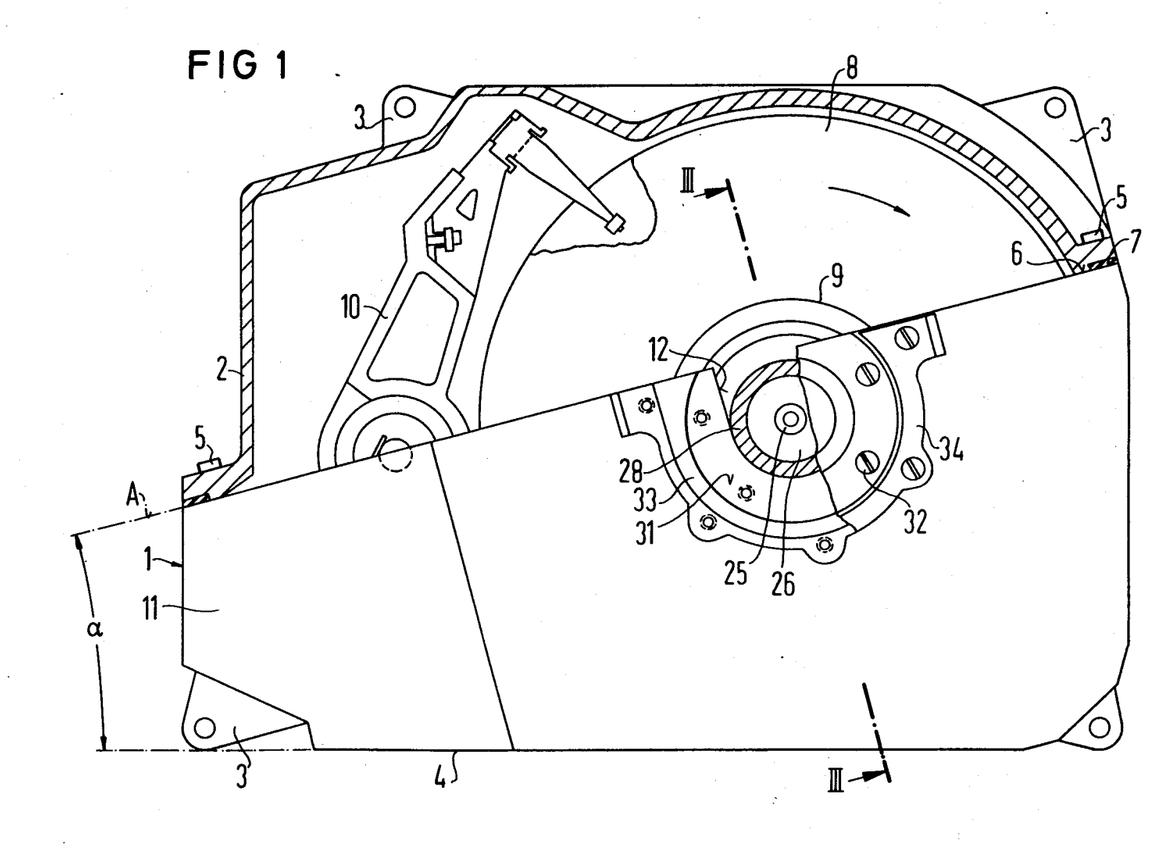
FIG. 1 is a bottom view of a magnetic disk memory constructed in accordance with the present invention.
Figure 2:
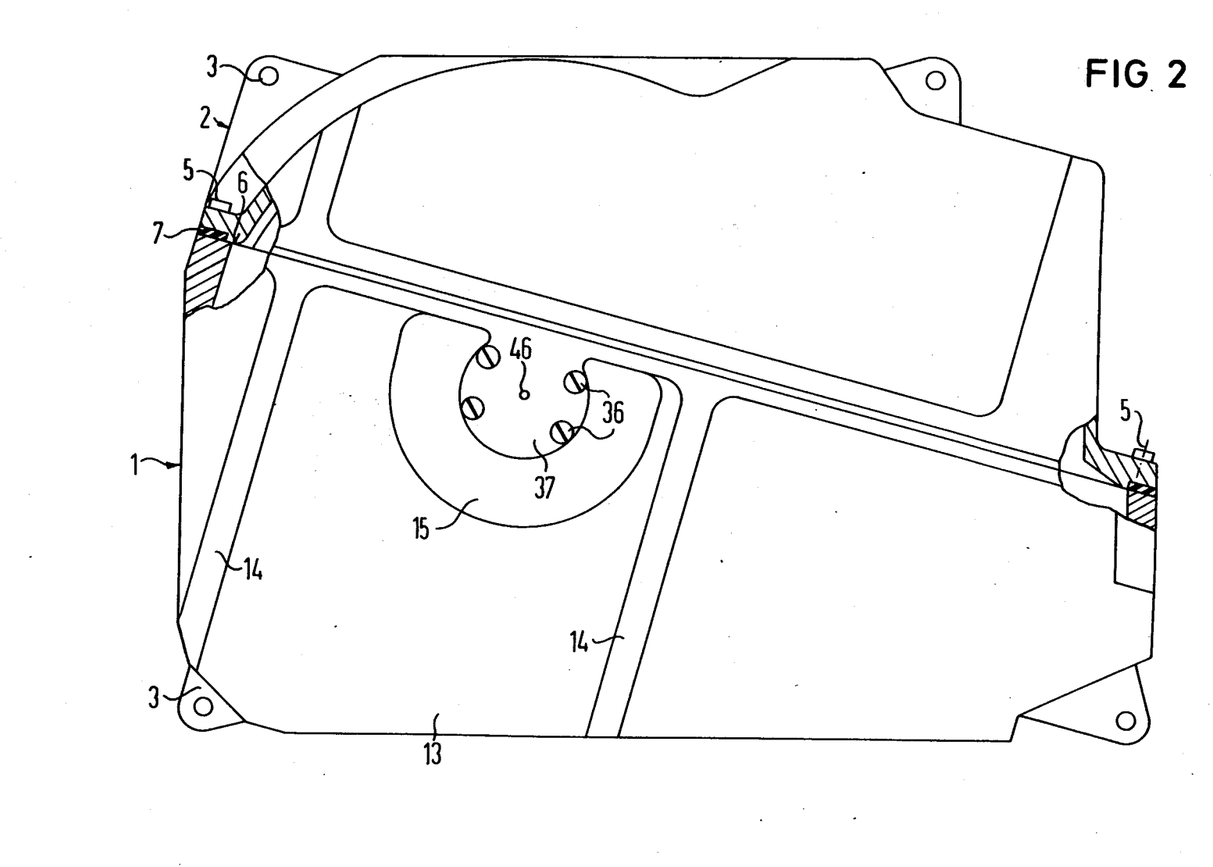
FIG. 2 is a plan view of a magnetic disk memory constructed in accordance with the present invention.

Referring to FIGS. 1 and 2, a housing is subdivided along a diagonally extending plane A into a supporting shell 1 and a cover 2 which together form an essentially rectangular box. The supporting shell 1 and the cover 2 comprise respective fastening eyelets or bosses 3 with which the housing can be disposed in a circumferential frame via, for example, rubber bumpers (not shown). The cover 2 sits on the supporting shell 1 in the parting plane A inclined relative to one end face 4 of the supporting shell 1 by an angle $\alpha$ and is releasably connected to the shell 1 by housing screws 5. In order to create a dust-tight and shielded connection between the cover and the supporting shell, the edge of the cover 2 lying in the parting plane A is designed such that it comprises a planar metallic sealing surface 6 and an outwardly disposed bezel into which a circumferential sealing ring 7 is inserted.

FIG. 1is a partially sectional view in order to show the significant structural portions within the magnetic disk memory. Therefore, a disk pack 8 may be seen which, as schematically indicated, is disposed on a hub 9 and rotates in the clockwise direction as indicated by an arrow. As may be seen, a rotational positioner 10 is laterally disposed next to the disk pack, the positioner being shown in its operating position. A pivot axis of the rotational positioner lying parallel to the axis of the disk pack 8 is visible in FIG. 1 close to the parting line A.

The section of the cover 2 illustrated in FIG. 1 also illustrates its shape, this being designed and constructed such that, on the one hand, it surrounds the disk pack at close distance but, on the other hand, still leaves a sufficient space for the motion of the positioner arm of the rotational positioner 10 even for sensing the outer tracks of the disk pack 8.

The partial section illustrated in FIG. 1 also illustrates the significance of the selected position and inclination of the parting plane A. This, on the one hand, is placed such that all structurally-essential housing functions are united in the supporting shell 1, this particularly applying to the two-sided bearing of the disk pack 8 but also to the fastening of the rotational positioner 10. On the other hand, the parting plane A is placed as close and parallel to the axis of the disk pack 8 as possible and is also inclined by an angle $\alpha$ so that the fitting depth for the rotational positioner 10 is optimized with respect to fabrication and assembly. A good accessibility to the function-defining portions of the magnetic disk memory is therefore achieved with the structural principle. Furthermore, all essential bearing elements of the housing are united in one workpiece. This is particularly significant for the manufacture, sine mutually-allocated bores or, respectively, fitting surfaces in the supporting shell 1, particularly for the formation of the bearing locations, can be manufactured in one chucking operation and chained tolerances are thus avoided.

Furthermore, the bottom view of the housing illustrated in FIG. 1 shows certain details of the first bearing location of the disk pack 8 which shall be explained in greater detail in connection with the description of FIG. 3. In the meantime, it should only be pointed out that a slot 12 is provided which is open towards the edge of the supporting shell and comprises a 180° curvature at its bottom as the bearing acceptance surface in the floor 11 of the supporting shell 1. The corresponding disk pack bearing is inserted into this slot when assembling the disk pack and is fixed to the bottom 11 of the supporting shell. Further details with respect thereto shall be explained below.

FIG. 2 illustrates the housing of the magnetic disk memory from the upper side and therefore shows details of top side wall 13 of the supporting shell including the second bearing location for the disk pack 8. In addition to reinforcing ribs 14, a kidney-shaped region 15 is provided which is symmetrically aligned with respect to the slot 12 in the opposite bottom sidewall 11 of the supporting shell and should be particularly emphasized. The view selected in FIG. 2 cannot show that this region 15, in fact, represents a depression in the top sidewall 13 of the supporting shell, but the same shall become clear from the sectional view of FIG. 3. Locally restricted, the wall thickness is reduced to such a degree by this depression that it is no longer only negligibly resilient, whereas the supporting shell 1 is otherwise constructed as a torsionally-stiff structure. The region 15 shall therefore be referred to below as the resilient wall region and its function shall be specifically described in detail in conjunction with the detailed description of the second bearing location of the disk pack 8.

Figure 3:
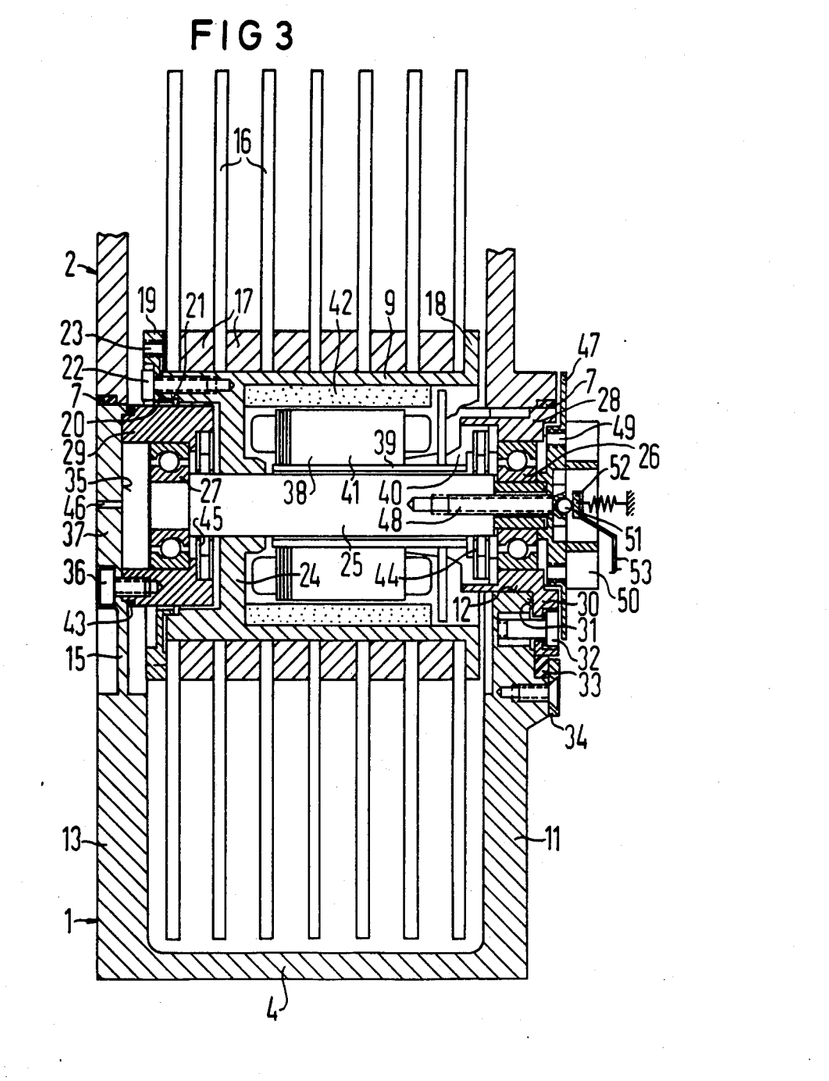
FIG. 3 is a sectional view taken substantially along the parting line III—III of FIG. 1 illustrating an embodiment of the bearing of the disk pack.

Referring to the sectional view of FIG. 3 through the housing of the magnetic disk memory along the parting line III—III of FIG. 1, the detailed structure of the disk pack 8 and of the two-sided seating in its supporting shell 1 is readily apparent. The hub 9 is designed as a hollow member. A plurality of magnetic disks 16 are slipped onto the exterior surface of the hub 9 and are held equidistant via spacer rings 17. At its one end, the hub comprises a radially-projecting flange 18 as a seating surface for the outermost magnetic disk. A tensioning ring 19 is provided at the opposite end of the disk pack, the tensioning ring comprising an inwardly-projecting shoulder 20 at its inner diameter and being seated in a turned-in, centering portion 21 of the hub 9. The tensioning ring 19, centered in this manner, is restrained against the end face of the hub with fastening screws 22 and therefore fixes the magnetic disks 16 on the hub member with a positive lock.

The tensioning ring 19 also assumes a second function, for it simultaneously serves as a first balancing disk. To this end, a plurality of threaded bores 23 are concentrically disposed on its exterior edge face. Small balancing weights are screwed into these bores, as needed, during a balancing operation.

The hub 9 comprises a center web 24 which is fixed to a revolving spindle with an interference fit. The spindle 25 of the disk pack 8 comprises a spindle peg at each end, the inner rings of respective ball bearings 26 and 27 being fixed to these pegs with an interference fit. The outer rings of the ball bearings carry a first or, respectively, second bearing bushing 28, 29, again with an interference fit. Both bearing bushings stand still after assembly of the disk pack.

The first bearing bushing 28 is inserted into the slot 12 let into the bottom 11 of the supporting shell and comprises a flange 30 to which a turn-in portion 31 let into the bottom 11 of the supporting shell from the outside and having a countersunk floor is designed as a fitting surface. This flange is secured to the bottom 11 of the supporting shell from the outside with further fastening screws 32.

In order to seal the interior of the housing in this region of the bearing location from the exterior, a sealing element 33 is provided which, laterally embracing the flange 30 of the first bearing bushing 28, is placed in the turn-in portion 31 and is squeezed into the turn-in portion 31 with the assistance of a contact pressure piece 34. The sealing element 33, as best interpreted from FIG. 1, is a projection of the circumferential sealing ring 7.

Allocated to the other bearing location of the disk pack 8, the second bearing bushing 29 is inserted into the cavity or axial recess of the hub 9 with sufficient play. It has its outwardly-directed end face inserted into a turn-in centering portion 35 let into the inner face of the sidewall 13 of the supporting shell 1 and is there fixed with straining screws 36 whose arrangement is clear in combination with FIG. 2. These straining screws are received through bores at the edge of the circular segment 37, whereby the circular segment is in the center of the resilient region 15.

It is essential for an understanding of the bearing of the disk pack 8 to point out that the disk pack 8 is inserted into the supporting shell as a completely-assembled module. Before incorporation, the ball bearings 26, 27 are axially unstressed and the axial spacing of the two fitting surfaces 31 and 35 of the disk pack bearing is therefore somewhat greater than the spacing between the corresponding seating surfaces of the first and second bearing bushings 28 and 29. The disk pack 8 can thus be slipped into the supporting shell 1. When the straining screws 36 are tightened, the resilient region 15 deform slightly in the manner of a membrane which is thereby tensed.

This tensing of the membrane, in turn, causes the two ball bearings 26 and 27 to be axially restrained, as is shown with exaggeration in FIG. 3. Due to the tensing of the resilient region 15, the second bearing bushing 29 is drawn toward the outside in the axial direction, so that the outer ring of the second ball bearing 27 is axially displaced relative to its inner ring. This bearing is therefore braced in the axial direction and, as a consequence thereof, the spindle 25 together with the entire hub 9 and its attached parts are likewise drawn in the axial direction towards the sidewall 13 of the supporting shell 1. A corresponding axial bracing of the first ball bearing 26 then occurs with this spindle dislocation, the outer ring of the first ball bearing 26 being fixed with an interference fit in the rigidly disposed first bearing bushing 28.

A drive motor 38 for the disk pack, designed as an internal motor, is disposed in the cavity of the hub between the web 24 and the first bearing bushing 28. Its stationary stator 39 is slipped over the spindle 25 with an adequate spacing and is fitted with an interference fit into the inner end of the first bearing bushing 28 with an annular fastening foot 40. The stator carries a stator winding 41. The power supply to this winding occurs via a cable (not shown) lead through an opening which occurs from the different diameters of the inner surface of the hub and the outer surface of the first bearing bushing 28. The windingless rotor of the drive motor 38 is composed of permanent magnets 42 in combination with the hub member which simultaneously forms a magnetic yoke.

It is of particular significance for the proper operation of the magnetic disk memory that the interior of the housing be kept free of dust. Given, on the one hand, the recording densities that are presently standard and, on the other hand, the extremely accurate spatial allocation of magnetic disks and magnetic heads (not shown here) which is thereby required, even superfine dust particles can produce inadmissible disturbances in the operation of the memory. In combination with the description of the bearing location of the disk pack in the bottom 11 of the supporting shell, it has therefore already been pointed out that the seating surface of the first bearing bushing 28 in the slot 12 is sealed by the sealing element 33.

The opposite bearing location is protected in a similar manner. The end face of the second bearing bushing 29 comprises an annular turn-down portion into which a further sealing ring 43 is inserted, this therefore sealing the bores in the top 13 of the supporting shell and, from one side, sealing the cavity of the second bearing bushing 29 with the second ball bearing 27 from the interior of the housing. It is therefore simultaneously avoided that dust particles which derive from lubrication and possible abrasion of the ball bearings 26 and, respectively, 27 proceed into the interior of the magnetic disk memory when, proximate to the ball bearings 26, 27, a respective magnetic fluid seal 44 or, respectively, 45 is also provided at the inner ends of the bearing bushings 28, 29. Such fluid seals are commercially available accessory parts and therefore require no further explanation.

The two bearing locations are therefore completely sealed off from the interior of the magnetic disk memory. The fact that the ball bearing 26 communicates with the external environment via channels is even desirable in this context. The problem of a dust-free sealing of the housing interior, in particular, is so serious that preventative measures must also usually be effected in order to avoid too great a pressure differential between the exterior of the magnetic disk memory and the external environment in extreme situations. An air filter (not shown) is therefore frequently provided in a bore through the housing, a pressure compensation being produced by way of this filter so that high pressure differences which allow the outwardly-acting seals to become disfunctional never occur.

As indicated above, the first ball bearing 26 in fact communicates with the external environment, but the second ball bearing 27 would be hermetically sealed as described above. An overpressure arising in the region of this ball bearing could, however, cause the allocated magnetic fluid seal 45 to become ineffective. This ball bearing is therefore also directly connected to the external environment via an air channel which is formed by a ventilation bore 46 centrally disposed in the resilient region 15.

It has already been mentioned in conjunction with the structure of the disk pack that the tensioning ring 19 simultaneously forms a balancing disk directly allocated to the second bearing location. Another balancing disk 47 is disposed approximate to the first ball bearing 26. This balancing disk 47 comprises a centering projection which is emplaced at the peg of the spindle 25 and is fixed coaxially to the spindle with the assistance of a central screw 48. Threaded bores 49 for receiving balancing weights are again uniformly distributed over the disk circumference.

A further function can also be realized with the balancing disk 47. During normal operation of the magnetic disk memory, as known, a magnetic head "flies" at a slight distance above the surface of the magnetic disk 16 assigned thereto on the basis of an air cushion which is formed as a consequence of the high relative speed between the magnetic head and the magnetic disk surface. As soon as this relative speed diminishes, this air cushion threatens to collapse and the magnetic head lands on the disk surface. The risk of damaging the disk surface is thereby extremely high. It must therefore be seen that the range of lower relative speeds is very quickly traversed. It is advantageous for this reason to provide a mechanical brake which brings the disk pack to a very quick standstill when it runs out. The balancing disk 47 therefore comprises a broad flange which can serve as a disk of a disk brake that is otherwise not shown in greater detail.

Over and above this, the balancing disk, outwardly projecting, can also have a ventilator wheel 50 emplaced theron, the ventilator wheel serving to cool electronic assemblies (not shown here) that are disposed in the plane of the ventilator wheel.

As known, finally, it is desirable to produce the best possible grounding contact for the hub 9 and, therefore, for the complete disk pack. Such a grounding contact can be achieved with a ball 51 inserted into the head of the fastening screw 48, a carbon lamina 52 being supported against the ball 51 under spring pressure. This carbon lamina, as indicated, is connected to a grounding wire 53.

A two-sided bearing for the hub of a magnetic disk memory in a one-piece supporting shell has been described with respect to the illustrative embodiment, whereby one part of the one wall of the supporting shell is designed as a resilient region and exerts the necessary restraining force in order to brace the ball bearings without play in the axial direction. Although we have described our invention by reference to this particular illustrative embodiment, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A magnetic disk memory comprising:
   an assembly including a spindle having an axis of rotation, a plurality of magnetic disks, disk mounting means mounting said magnetic disk for rotation with said spindle, and disk driving means integrated into said disk mounting means;
   a housing, including a one-piece hollow support shell and a cover for said shell, said housing comprising first and second parallel opposed walls, each having an each for receiving said cover, said first wall comprising a slot in said edge and said second wall comprising a resilient section, including a region arranged opposite to said slot and having a reduced wall thickness with respect to the thickness of said second wall;
   said spindle including first and second ends and having its axis of rotation coinciding with respective centers of said slot and said resilient section;
   first and second bearings, each including an inner part mounted on a respective end of said spindle and an outer part;
   first and second bearing mounting means respectively mounting said outer parts of said first and second bearings within said slot of said first wall and to said resilient section of said second wall; and
   a plurality of screws securing said first and second bearing mounting means to the respective walls and tensing said bearings in parallel to the axis of rotation of said spindle by inwardly flexing said resilient section.

2. A magnetic disk memory comprising:
   a housing including a hollow support shell and a cover for said shell, said shell comprising first and second opposed walls, said first wall comprising an edge and a slot in said edge including a 180° curved slot floor, said second wall including a resilient section opposite to said slot;
   a spindle including an axis of rotation and first and second end pegs;
   a plurality of magnetic disks;

disk mounting means mounting said plurality of magnetic disks spaced apart for rotation about the axis of rotation of said spindle;

first and second ball bearings each including an inner ring mounted on a respective end peg, and an outer ring;

first and second bearing bushings respectively mounting said outer rings of said ball bearings;

said first bearing bushing disposed in said slot and secured to said first wall; and tensioning means connecting said second bearing bushing to said resilient region and tensioning said bearings parallel to the axis of rotation of said spindle by inwardly flexing said resilient section.

3. The magnetic disk memory of claim 2, wherein:

said resilient region comprises a kidney-shaped region having a reduced wall thickness with respect to the thickness of said second wall and positioned symmetrical relative to the axis of rotation of said spindle and including a center region in the center thereof having a thickness greater than said reduced thickness, said center region including a centering recess facing and coaxial to said axis of rotation of said spindle for receiving said second bearing bushing; and wherein said tensioning means comprises a plurality of screws securing said second bearing bushing to said center region.

4. The magnetic disk memory of claim 3, and further comprising:

a sealing ring, said second bearing bushing including a recess receiving said sealing ring and clamping said sealing ring against said center region; and a magnetic fluid seal disposed about said spindle adjacent said second ball bearing.

5. The magnetic disk memory of claim 4, wherein:

said resilient region comprises means defining a bore therethrough forming a pressure compensation channel between the sealed space of said second bearing and the exterior of said magnetic disk memory.

6. The magnetic disk memory of claim 5, and further comprising:

a further magnetic seal disposed about said spindle adjacent said first ball bearing, said further magnetic seal sealing the interior of said housing from the location of said first ball bearing.

7. The magnetic disk memory of claim 2, wherein said disk mounting means comprises:

a hollow hub including a center web having a central aperture receiving said spindle in an interference fit; and a drive motor disposed in said hollow hub and including a permanent magnet motor secured to the inner surface of said hollow hub and a stator, including a stator winding, disposed about said spindle and fixed to said first bearing bushing.

8. The magnetic disk memory of claim 7, wherein:

said shell comprises a recess concentric to said 180° curvature of said slot; and said first bearing bushing comprises a flange received in said recess.

9. The magnetic disk memory of claim 8 wherein:

said flange of said first bearing bushing comprises a plurality of concentrically disposed bores adjacent its periphery;

said first wall comprises a plurality of threaded bores aligned with said bores of said flange; and a plurality of fastening screws extend through said bores of said first bearing bushing and are threadedly received in said threaded bores for fastening said first bearing bushing to said first wall.

10. The magnetic disk memory of claim 9, wherein:

said hub comprises a flange at the end thereof adjacent said first bearing bushing as a seat for one of said magnetic disks;

a plurality of spacers are provided individually between said disks and are received over the exterior surface of said hub;

said hub comprises an internal peripheral recess at its end opposite said flange;

a tensioning ring includes a centering projection received in said recess; and a plurality of fastening screws secure said centering ring to the appertaining end of said hub.

11. The magnetic disk memory of claim 10, wherein:

said tensioning ring is designed as a first balancing disk and comprises threaded bores uniformally distributed over its circumference for receiving balancing weights.

12. The mageneic disk memory of claim 11, wherein:

the inner diameters of said tensioning ring and of said hub are greater than the outer diameter of said second bearing bushing so that the disk pack formed by said hub, said spacers, said disk and said drive motor can be dismanteled by releasing said tensioning ring without removing said second bearing.

13. The magnetic disk memory of claim 12, and further comprising:

a second balancing disk concentrically fixed to said first end peg of said spindle.

14. The magnetic disk memory of claim 13, wherein:

said second balancing disk comprises a concentrically disposed collar at its inner surface, said collar being slipped onto said first spindle peg; and a central screw connect said second balancing disk to said first spindle peg.

15. The magnetic disk memory of claim 14, wherein:

said second balancing disk comprises a broad flange which is designed as a brake disk for a mechanical brake.

16. The magnetic disk memory of claim 15, and further comprising:

a ventilator wheel carried on said second balancing disk.

17. The magnetic disk memory of claim 16, wherein:

said central screw comprises a head including a recess; and a grounded spring-loaded carbon lamina electrically contacts said recess.

18. The magnetic disk memory of claim 17, and further comprising:

a conductive sphere mounted in said recess and contacted by said grounded carbon lamina.

19. A magnetic disk memory comprising:

a housing including a hollow support shell and a cover for said shell, said housing comprising first and second parallel opposed walls, and said first wall comprising an edge for engaging said cover and a slot in said edge;

a spindle including first and second ends;

a plurality of magnetic disks;

disk mounting means mounting said plurality of magnetic disks spaced apart for rotation with said spindle;

first and second bearings each including an inner part mounted on a respective spindle end, and an outer part;

first and second bearing bushings respectively mounting said outer parts of said bearings to said first and second walls with said first bearing bushing disposed in said slot and secured to said first wall and said second bearing bushing connected to said second wall;

said second wall comprising a resilient section including a region adjacent said slot and coaxial with the axis of rotation of said spindle and having reduced wall thickness with respect to the thickness of said second wall and a center portion having a thickness greater than said reduced thickness, said center portion including a centering recess facing said second bearing bushing and coaxial to the axis of rotation of said spindle for receiving said second bearing bushing; and a plurality of screws securing said second bearing bushing to said center portion.

20. The magnetic disk memory of claim 19, and further comprising:

a sealing ring, said second bearing bushing including a recess receiving said sealing ring and clamping said sealing ring against said center portion; and a magnetic fluid seal disposed about said spindle adjacent said second bearing bushing and said second bearing.

21. The magnetic disk memory of claim 20, wherein:
said resilient region comprises means defining a bore therethrough forming a pressure compensation channel between the seal space for said second bearing and the exterior of said magnetic disk memory.

22. The magnetic disk memory of claim 21, and further comprising:

a further magnetic seal disposed about said spindle adjacent said first bearing bushing and said first bearing, said further magnetic seal sealing the interior of said housing from the location of said first bearing.

23. The magnetic disk memory of claim 19, wherein said disk mounting means comprises:

a hollow hub including a center web having a central aperture receiving said spindle in an interference fit; and a drive motor disposed in said hollow hub and including a permanent magnet rotor secured to the inner surface of said hollow hub and a stator, including a stator winding, disposed about said spindle and fixed to said first bearing bushing.

24. The magnetic disk memory of claim 23, wherein:
said shell comprises a recess concentric to said slot; and
said first bearing bushing comprises a flange received in said recess.

25. The magnetic disk memory of claim 24, wherein:
said flange of said first bearing bushing comprises a plurality of concentrically disposed bores adjacent its periphery;

said first wall comprises a plurality of threaded bores aligned with said concentrically disposed bores; and a plurality of fastening screws extend through said bores of said flange and are threadedly received in said threaded bores for fastening said first bearing bushing to said first wall.

26. The magnetic disk memory of claim 25, wherein:
said hub comprises a flange at the end thereof adjacent said first bearing bushing as a seat for one of said magnetic disks;

a plurality of spacers are provided individually between said disks and are received over the exterior surface of said hub;

said hub comprises an internal peripheral recess at its end opposite said flange;

a tensioning ring includes a center projection received in said recess; and a plurality of fastening screws secure said centering ring to the appertaining end of said hub.

27. The magnetic disk memory of claim 26, wherein:
said tensioning ring is designed as a first bouncing disk and comprises threaded bores uniformly distributed over its circumference for selectively receiving balancing weights.

28. The magnetic disk memory of claim 27, wherein:
the inner diameters of said tensioning ring and of said hub are greater than the outer diameter of said second bearing bushing so that the disk pack, including the magnetic disk mounted on said hub, can be dismanteled by releasing said tensioning ring without removing said second bearing.

29. The magnetic disk memory of claim 28, and further comprising:

a second balancing disk concentrically fixed to said first end of said spindle.

30. The magnetic disk memory of claim 29, wherein:
said second balancing disk comprises a concentrically disposed collar at its inner surface, said collar being slipped onto said first spindle end; and a central screw connect said balancing disk to said first spindle end.

31. The magnetic disk memory of claim 30, wherein:
said second balancing disk comprises a broad flange which is designed as a brake disk for a mechanical brake.

32. The magnetic disk memory of claim 31, and further comprising:

a ventilator wheel carried on said second balancing disk.

33. The magnetic disk memory of claim 32, wherein:
said central screw comprises a head including a recess; and a grounded spring-loaded carbon lamina electrically contact said recess.

34. The magnetic disk memory of claim 33, and further comprising:

a conductive sphere mounted in said recess and contacted by said ground carbon lamina.

35. A magnetic disk memory comprising:
a housing, incluidng a hollow support shell and a cover for said shell, said housing comprising first and second parallel opposed walls, said first wall comprising an edge for engaging said cover and a slot in said edge;

a spindle, including first and second ends, and an axis of rotation;

a disk pack including a hollow hub mounted on said spindle for rotation therewith, a drive motor mounted within said hollow hub and including a rotor connected to said hollow hub and a stator fixed within said hollow hub, said drive motor energizable to cause rotation of said hollow hub and said spindle;

first and second bearings each including an inner part mounted on a respective end of said spindle and an outer part;

first and second bearing mounting means respectively mounting said outer parts of said first and second bearings, said second wall comprising a resilient section, including a region adjacent said slot and coaxial with the axis of rotation of said spindle receiving said second bearing mounting means therein and having a reduced wall thickness with respect to the thickness of said second wall; and a plurality of screws securing said first and second bearing mounting means to the respective walls and tensioning said bearings parallel to the axis of rotation of said spindle by inwardly flexing said resilient section.

* * * * *